Figure 1:
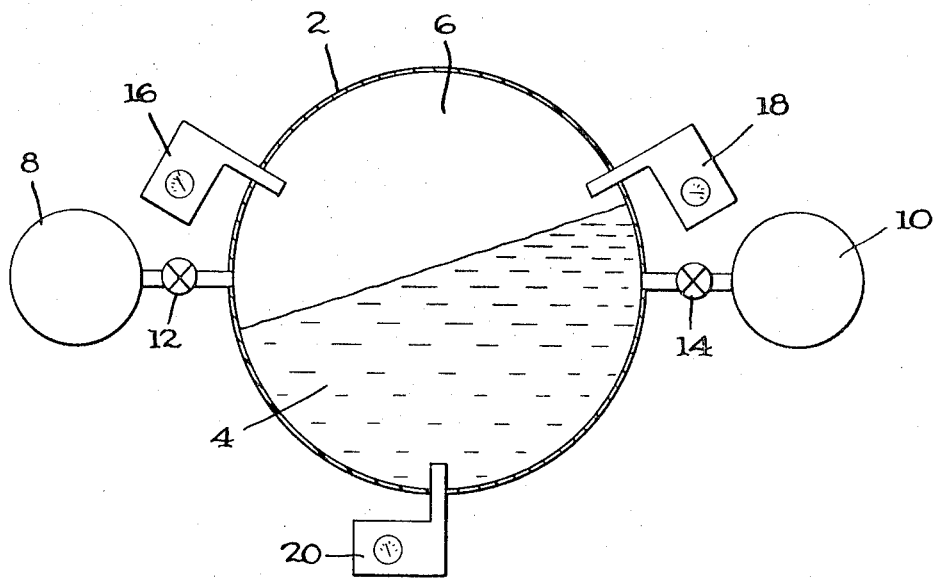

United States Patent

[11] 3,624,828

| [72] | Inventor | Harrison F. Edwards<br>Norwich, N.Y. |
|---|---|---|
| [21] | Appl. No. | 768,320 |
| [22] | Filed | Oct. 17, 1968 |
| [45] | Patented | Nov. 30, 1971 |
| [73] | Assignee | Simmonds Precision Products, Inc.<br>Tarrytown, N.Y.<br>Continuation of application Ser. No. 406,996, Oct. 28, 1964. This application Oct. 17, 1968, Ser. No. 768,320 |

[54] VOLUME MEASURING SYSTEM
4 Claims, 2 Drawing Figs.

[52] U.S. Cl. .................................................. 73/149, 73/290
[51] Int. Cl. ........................................................ G01f 17/00
[50] Field of Search ............................................. 73/149, 290

[56] References Cited
UNITED STATES PATENTS

| 1,152,083 | 8/1915 | Fenderl ...................... | 250/106 |
| 3,018,376 | 1/1962 | Vanderschmidt ............ | 250/43.5 |
| 3,170,064 | 2/1965 | Martin ....................... | 250/43.5 |
| 3,237,451 | 3/1966 | Haeff ......................... | 73/149 |
| 3,254,211 | 5/1966 | Black ......................... | 250/43.5 |
| 3,310,674 | 3/1967 | Brunton ...................... | 250/83.6 |

*Primary Examiner*—S. Clement Swisher
*Attorney*—Edwin E. Greigg

ABSTRACT: A system for measuring the quantity of fluid in a container having an ullage space provided therein which utilizes a trace gas introduced into the ullage space and a detecting means for measuring the density of the trace gas. By measuring the density of the trace gas the volume of the ullage space and hence the volume of the fluid in the container can be ascertained.

PATENTED NOV 30 1971  3,624,828

INVENTOR

HARRISON F. EDWARDS

BY *Edwin E. Greigg*

ATTORNEY

VOLUME MEASURING SYSTEM

This application is a continuation application Ser. No. 406,996, filed Oct. 28, 1964.

This invention relates to an apparatus for determining volume of a container or a substantially enclosed container.

An object of the present invention is to provide an apparatus for accurately measuring the volume of a container or a substantially enclosed container.

Another object of the present invention is to provide an apparatus for accurately measuring the volume of gas in a container or a substantially enclosed container.

A further object of the present invention is to provide an apparatus for accurately measuring liquid or gas quantity at all times without regard to the attitude of the tank containing the liquid or gas to be measured.

Another object of the present invention is to provide an apparatus for accurately measuring liquid or gas quantity in an environment wherein the force of gravity approaches zero.

Another object of the present invention is to provide an apparatus for accurately measuring the liquid or gas quantity without such apparatus contacting the liquid or gas to be measured.

The present invention is predicated upon the principle that, by measuring the density of a known mass or trace gas introduced into the ullage space in a closed tank, one can determine the volume of the ullage space, the volume of the gas enclosed in the ullage space, as well as the volume of the liquid contained in the tank. In addition, a change in pressure in the ullage space created by temperature changes or addition of ullage gas does not affect the density of the trace gas. Thus, the only factor which will change the density of the trace gas is a change in the ullage volume as a result of the normal use of the liquid or gas.

One preferred embodiment of the present invention constructed in accordance with the principles stated above comprises substantially the provision of a plurality of gas analyzers spaced about the periphery of the tank and projecting into the tank, such that one or more gas analyzers are in contact with the ullage space regardless of the attitude assumed by the tank. By measuring the density of the trace gas introduced into the ullage space, one can infer the volume of the ullage space. By knowing the volume of the ullage space, one can ascertain the volume of the liquid or gas.

Figure 2:
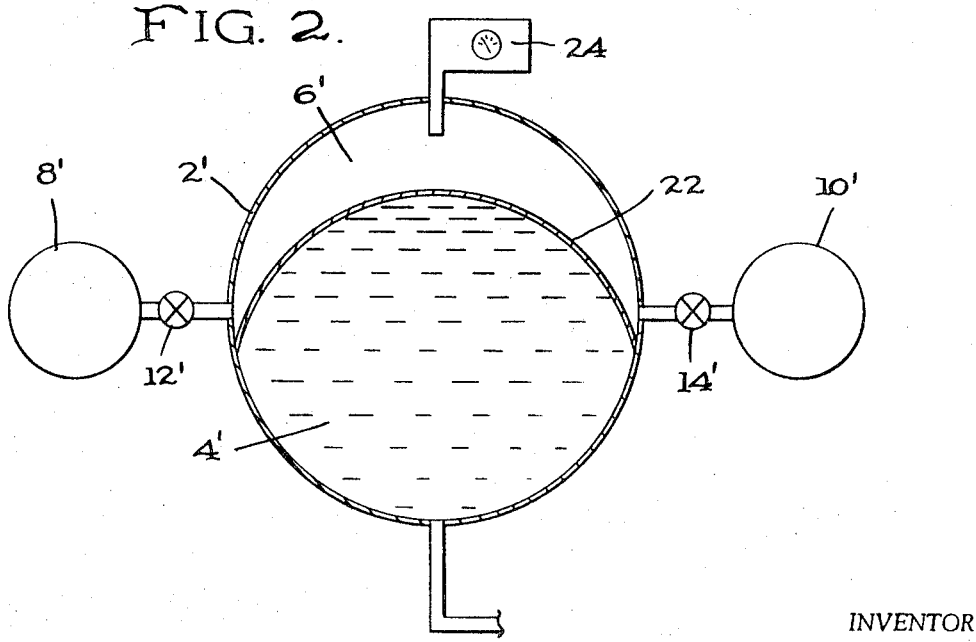

Other objects and advantages of the present invention will be more readily apparent from a further consideration of the following detailed description of the drawings illustrating a preferred embodiment of the invention, in which:

FIG. 1 is a diagrammatic representation of one embodiment of the present invention; and FIG. 2 is a diagrammatic representation of a modification of the embodiment shown in FIG. 1.

As shown in FIG. 1, one form of the liquid-measuring apparatus constructed in accordance with the present invention comprises a closed fuel tank 2 containing a quantity of liquid fuel or gas 4 which provides an ullage space 6. Further provided is an ullage gas tank 8 and a trace gas tank 10 connected to the tank 2 for providing through suitable valve means 12, 14 an ullage gas 6 and a trace gas respectively into the tank 2. A plurality of gas detectors 16, 18, 20 are provided on the periphery of the tank 2 in spaced relationship to each other such that one or more of the gas detectors will be always in contact with the ullage space, which will be a contiguous medium, regardless of the attitude assumed by the tank. The gas detectors may be constructed of the Ohmart cell type, the details of which are disclosed and claimed in U.S. Pat. No. 2,737,592, and which details of construction form no part of the present invention. It is sufficient here to state however, that when the ionizable gas within the cell as disclosed in said patent, is ionized by the impingement of ionizing radiation or be secondary radiation, in turn caused by the ionizing energy there will be a discriminatory migration of ions toward the electrodes. The positive ions will move toward the more noble electrode and the negatively charged electrons will move toward the more active electrode. These particles will collect on the respective electrodes causing a potential difference to be built up between them. The cell is then effective to generate a current, the magnitude of which varies with the density of the impinging radiant energy. The trace gas utilized in the present invention will comprise a radioactive material. Various kinds of trace material, preferably radioactive isotopes, may be employed such as, for example, iodine 131 or iridium 192 in solution in oil or water or particle-type tracers generally comprising finely divided solids carrying absorbed or plated coatings of radioactive materials such as gold 198 as is now well known in the art. In addition to utilizing a radioactive tracer, the present invention could utilize the paramagnetic oxygen method, in which case magnetic gas analyzer detectors, as well-known in the art, can be substituted for the radioactive sensitive gas detectors for measuring the magnetic susceptibility of the trace gas comprising a known mass of oxygen. It is to be understood that the tank 2 need not be closed if a density reading of the trace gas can be taken immediately following its injection into the tank.

Shown in FIG. 2 is another embodiment of the present invention wherein those parts which are similar to the FIG. 1 embodiment are designated by primed reference numerals. FIG. 2 shows a closed tank 2' and a bladder 22 contained therein for housing the liquid fuel or gas 4'. Connected to the tank is an ullage gas tank 8' and a trace gas tank 10' for supplying respectively an ullage gas and a trace gas through suitable valves 12', 14', as described above. In this construction only one gas analyzer 24 is provided since the ullage space 6' provided in the tank remains fixed regardless of the attitude assumed by the tank. It will be seen that the liquid or gas to be measured is always out of contact with any of the measuring apparatus as, for example, the gas analyzer. The gas analyzer 24 is used to detect the density of a known mass of trace gas introduced into the ullage space 6' in the same manner as described above. It is to be understood that in both constructions shown in FIGS. 1 and 2 the density of the trace gas varies only with a change in volume of the ullage space 6, which, in turn, varies directly with the change in volume of the liquid or gas 4. Changes in pressure in the ullage space created, for example, by temperature changes or addition of ullage gas does not affect the density of the trace gas.

That which is claimed is:

1. In a volume measuring system, the combination of a container, a fluid occupying a portion of the interior space in said container, means connected to said container for introducing a known mass of trace gas into the ullage portion of said interior space, and a plurality of detecting means spaced along the surface of said container and extending into said container for measuring the density of said trace gas for any position of said fluid in the interior space of said container.

2. In a system according to claim 1, wherein said container is a spheroid and said plurality of detecting means comprises three detectors equally spaced about the periphery of said container.

3. In a system according to claim 1, wherein said detecting means are ion current detectors.

4. In a system according to claim 1, wherein said detector means are magnetic gas analyzer detectors.

* * * * *